United States Patent [19]

Morton

[11] 4,115,806

[45] Sep. 19, 1978

[54] IMAGE ANALYSIS DATA TRANSFER

[75] Inventor: Roger R. A. Morton, Penfield, N.Y.

[73] Assignee: Bausch & Lomb Incorporated, Rochester, N.Y.

[21] Appl. No.: 580,438

[22] Filed: May 23, 1975

[51] Int. Cl.² .................................................. H04N 7/18
[52] U.S. Cl. .................................. 358/107; 235/92 PC; 364/515
[58] Field of Search .................... 178/6, 6.8, DIG. 22, 178/DIG. 36, DIG. 37; 340/146.3 AC, 146.3 AE; 235/92 PC; 364/515; 358/107

[56] References Cited

U.S. PATENT DOCUMENTS

| | | | |
|---|---|---|---|
| 2,791,695 | 5/1957 | Bareford | 235/92 PC |
| 3,390,229 | 6/1968 | Williams | 178/DIG. 36 |
| 3,619,494 | 11/1971 | Fisher | 178/6.8 |
| 3,624,604 | 11/1971 | Gibbard | 340/146.3 AC |
| 3,751,585 | 8/1973 | Fisher | 178/6.8 |
| 3,946,361 | 3/1976 | Cruttwell | 340/146.3 AC |

*Primary Examiner*—Howard W. Britton
*Attorney, Agent, or Firm*—Bernard D. Bogdon; Frank C. Parker

[57] ABSTRACT

This system measures features or objects each represented by an image by scanning the image in a line scan raster and processing the resulting video signal to determine measurement parameters describing each feature. The system practices methods for obtaining the measurements from signals generated from line intercepts of individual or groups of features. Signal information defining the position of line intercepts intersecting the features, or topological points of each feature is obtained. This information is related to X and Y coordinates and is stored for subsequent use to generate index signals at respective positions in the scan format relating to the stored positions of the X and Y coordinates. The index signals are used to read measurement parameter information from measurement logic or memory.

10 Claims, 17 Drawing Figures

IMAGE ANALYSIS DATA TRANSFER

CROSS-REFERENCE TO RELATED APPLICATIONS

This application is cross referenced to concurrently filed and copending patent applications entitled (a) Image Analysis Data Extraction, Ser. No. 580,392 for inventors R.R.A. Morton et al; (b) Image Analysis Measurement Apparatus and methods, Ser. No. 580,439 for inventor R.R.A. Morton; and (c) Image Analysis Indexing Apparatus and Methods, Ser. No. 580,393 for inventor R.R.A. Morton.

BACKGROUND OF THE INVENTION

1. Field of the Invention:

This invention relates to image analysis data extraction apparatus and methods and more specifically to image analysis and data extraction apparatus and methods where the data is related to coordinate locations of an image or images under analysis.

2. Description of the Prior Art:

It has often been desirable to electronically extract information from images of features or objects. Specifically, these images may relate to particles viewed under a microscope, topography feature photographs such as a satellite photograph of lakes, or microscopic cellular images. Basic image scanning techniques for extracting this information is discussed, for example, in U.S. Pat. No. 3,805,028 entitled Methods of and Apparatus foe Determining the Quantity and Physical Parameters of Objects, issued Apr. 16, 1974 for inventor Roger R. A. Morton and U.S. Pat. No. 3,763,357 entitled Threshold Circuit for Converting a Video Signal to a Binary Video Signal, issued Oct. 2, 1973 for inventor Roger R. A. Morton. These patents disclose systems for scanning the image repeatedly with a raster scan using a television camera or similar device and processing the video signal from the television camera to produce signals corresponding to the intensity profile along the scan lines. These signals can then be processed by a variety of means.

Prior inventions, such as described in U.S. Pat. No. 3,244,810 entitled Intercept Scanning System issued Apr. 5, 1966 for inventor David A. Williams, have disclosed methods for extracting data on all features within the field of view and accumulating the data by sorting it into counters. In U.S. Pat. No. 3,244,810, the time at which the data is extracted corresponds to the time at which the measurement was completed and it was not keyed on any specific predetermined point in the field. However, patents such as U.S. Pat. No. 2,494,441 entitled Method and Apparatus for Electronically Determining Particle Size Distribution, issued Jan. 10, 1950 for inventor James Hillier accumulated data over an entire field of view or accumulated data at the time it occurred. The point of extraction corresponds to the time at which, for example, a certain event related to the generation of the data was determined to have occurred.

Other techniques have also been disclosed in the prior art, for extracting data from specific points in a field of view. In U.S. Pat. No. 3,865,493 entitled Apparatus for Direct Electronic Measurement of Images, issued Feb. 11, 1975 for inventor Roger R. A. Morton information is made to correspond to areas extracted in a single point on a feature. However, in that specific reference example, the data extraction is limited to area.

U.S. Pat. No. 3,805,028 entitled Methods of and Apparatus for Determining the Quantity and Physical Parameters of Objects, has, for example, disclosed systems and techniques for releasing data accumulated on a feature during the scan line after the last intercept of the feature and has also disclosed methods for processing data extracted from successive scans from the same feature. Techniques having similar end results to these have been disclosed in U.S. Pat. No. 3,619,494 entitled Counting Systems in Image Analysis Employing Line Scanning Techniques, issued Nov. 9, 1971 for inventor Colin Fisher and U.S. Pat. No. 3,624,604 entitled Image Analysis, issued Nov. 30, 1971 for inventor David Gibbard.

Previous systems have not extracted data during arbitrary fields of scan by keying the data transfer using information stored on an initial scan, nor have they extracted data from the field of view at any time, to thereafter be outputted with the keying data previously stored.

SUMMARY OF THE INVENTION

By contrast, over the identified and known prior art, the present invention permits determination and storage of the location of a point on an initial field of scan at which data is extracted so that the point of extraction on subsequent scans can be arranged to be identical or at least keyed to the point determined on the initial field of scan. Earlier systems have not demonstrated these capabilities.

This invention discloses a data extraction system and technique of defining the boundaries of the objects intercepted on the scan lines from the video signal and extracting the boundary information for further processing. A wide variety of measurements can be performed on such images and it is often desirable to extract data which may be identified with a particular position in the image or field of view.

The field of scan is defined by the area scanned in sequential parallel scan lines in a raster format. A field of scan involves scanning every scan line position once. Scanning the field occurs along successive adjacent horizontal lines starting at the first line and finishing at the last. Fields of scan generally occur repeatedly and preferably repetitively and substantially identical scans are performed on each field so that the video signal derived from the intensity profile of the image along the scan lines of the field forms a similar signal profile on each of subsequent field scans, providing the image being scanned is not changed.

The term, field of view, relates to the area of the image which is scanned during a complete field of scan. Alternative scan formats, however, are not specifically excluded provided that the coordinates of the scanning point within the field of scan are available or can be derived at any desired time. Thus, for example, the initial field of scan may include a complete search of the field of view, while subsequent fields of scan may be limited to scanning locations already identified in the field of view.

On an initial field of scan, data is extracted at fixed positions in the field of view which positions are termed index points. These points may relate to scan line intercepts of features or positions logically related to associated groups of scan line intercepts.

During the initial field of scan, the position of index points is defined from intercept data derived from the video signal or at predetermined positions within the field of view, and is stored as positional data in a memory. In the preferred embodiment this stored data is referred to as index point coordinate data and includes information relating to the X and Y coordinates of each index point derived from the initial field of scan. This index point coordinate data is used on subsequent fields of scan, termed measurement fields of scan, during which measurement related data is extracted from the image. This measurement related data is keyed by the index points at the positions defined by the index point coordinate data.

It is possible to extract from repetitive fields of view different types of information and measurements related to individual features, scan line intercepts or portions thereof. This permits information to be derived from the preselected points or index points in a field of view so that the derived information is indexed on the specific point.

The index points stored in memory either initiate the data transfer or are used to identify the measurement data at the output of the apparatus during a measurement field of scan. The index points may be modified or qualified to permit or inhibit data flow from any point during any selected measurement field of scan. This modification of stored index points takes place, based on either the specific coordinate of the index point during a coordinate qualifying transfer, or a measurement related to the index point, during a measurement qualifying transfer. Thus, data can be made to flow only from selected points, which selection, for example, can be done prior to the field of scan from which the measurement data is to be transferred.

DETAILED DESCRIPTION OF THE PREFERRED EMBODIMENT

Figure 1A:
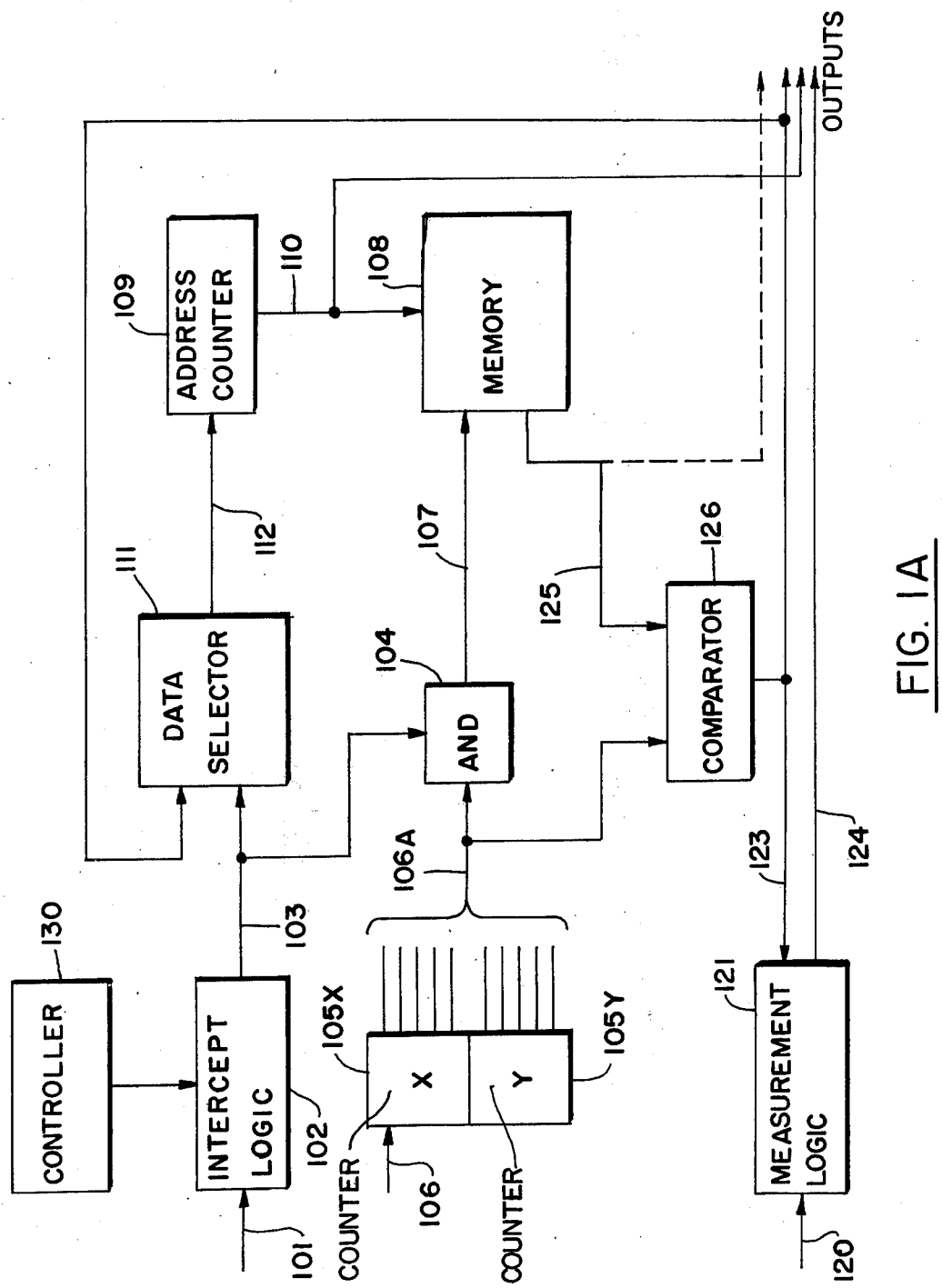
FIG. 1A is an illustration of an image analysis system for extracting and processing image measurement related data according to the principles of the present invention.

FIG. 1A illustrates the basic principle of the invention. A digital signal, such as the binary video of the U.S. Pat. No. 3,805,028 entitled Methods of and Apparatus for Determining the Quantity and Physical Parameters of Objects, issued Apr. 16, 1974 for inventor Roger R. A. Morton from threshold circuit 53 of FIG. 3, enters on line 101 into intercept logic circuit 102. Logic circuit 102 generates a signal on line 103 corresponding to an occurrence of a specific event in the field of view. An exemplary event such as the occurrence of a leading edge of a feature such as at point 320 of feature 310 in FIG. 3A, can be the basis for the specific type of signal being selected by controller 130. This is exemplified in FIG. 2A where line 101 enters a positive differentiator comprising capacitor 201, resistor 202, and a catching diode 203 to form a signal on line 204 on the leading edge of a feature when line 101 corresponds to a positive going transition derived from feature intercepts.

Figure 2D:
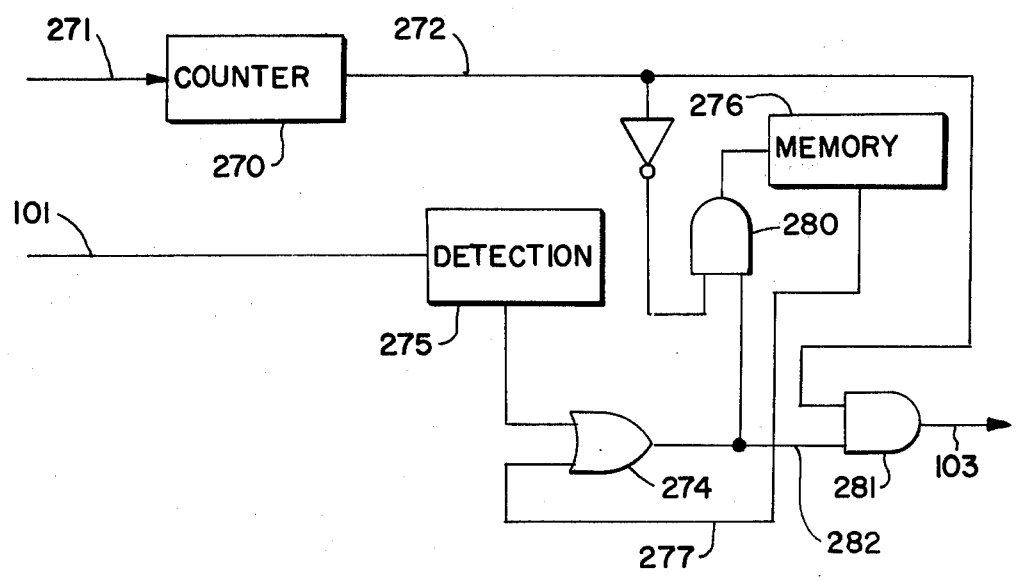
FIG. 2D is a circuit for implementing the intercept logic circuit illustrated in FIG. 1B.
Figure 2A:
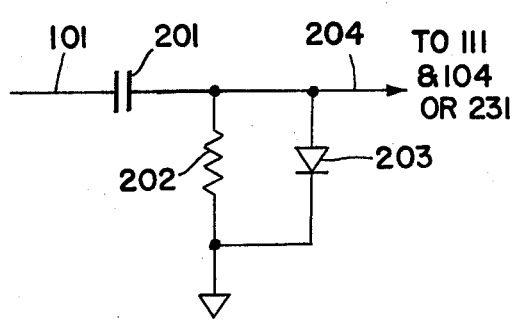
FIG. 2A is an illustration of a circuit for signal selection by the controller in the system of FIG. 1A.
Figure 3A:
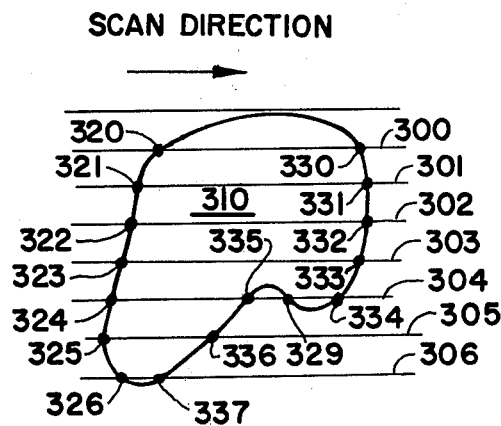
FIG. 3A illustrates line scans through a feature identifying intercept points.

FIG. 3A illustrates line scans 300 through 306 intercepting feature 310, causing a pulse on line 204 in FIG. 2A from gate capacitor 201 at points 320 through 321, respectively, along the leading edge of feature 310 at the start of the intercept including at point 329. Other alternatives which may be used to implement the intercept logic circuit 102 will be discussed hereinafter. Examples of other types of output signals corresponding to the occurrences of specific events in the field of view, which are generated by intercept circuit 102 include signals occurring at predetermined positions across the field of scan in a lattice or other regular pattern independent of the binary video signal. The output 103 from the intercept logic circuit 102, containing the pulses corresponding to the locations selected by the intercept logic circuit 102, are passed to multiple AND gate 104.

X coordinate counter and oscillator 105X and 105Y receive scan synchronizing pulses from the television camera sweep circuits, for example, block 10 in FIG. 3 of U.S. Pat. No. 3,805,028 on inputs denoted by line 106 of FIG. 1A hereof. Counter 105X counts oscillator pulses and is reset on each scan line. Counter 105Y counts line scans and is reset at the beginning of a field of scan to produce coordinate information on line 106A continuously in synchronism with the scanning format to identify the X and Y coordinates of the scanning spot at any instant.

On an initial field of scan, nominated by controller 130, coordinate data of indexing points signalled by line 103 is stored in memory 108 as follows. When a pulse from intercept logic circuit 102 passes through line 103 to multiple AND gate 104, the AND gate 104 is opened and the X and Y coordinate location data on line 106A passes through AND gate 104 and along line 107 to be stored in random access word organized memory 108 at a word storage location determined by a memory address counter 109. Counter 109 passes the address by line 110 to the memory address input. Memory 108 is placed in the store mode by controller 130, for the initial field of scan. The address counter 109 is incremented for each pulse on line 103 which passes through data selector 111, controlled by controller 130, on line 112 to the counter 109. Thus, at the completion of the initial field of scan, the memory 108 contains the X and Y coordinates of the events corresponding to the signals at the output 103 of the intercept logic counter 102.

Figure 1B:
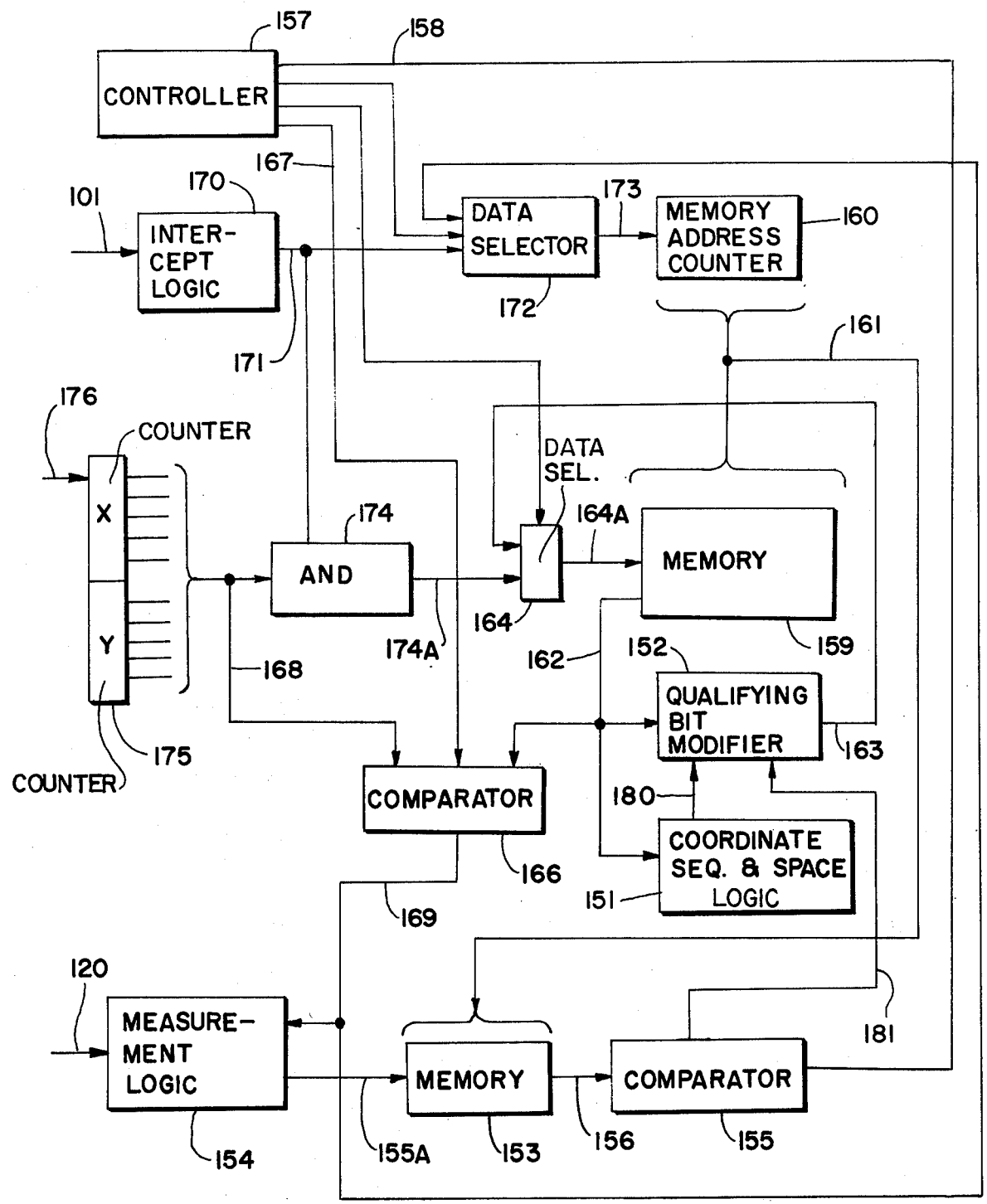
FIG. 1B is a modification of the circuit of FIG. 1A illustrating a system for correlating data.
Figure 1C:
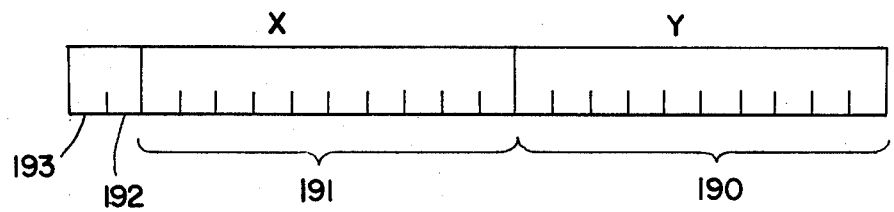
FIG. 1C illustrates an exemplary data word modified for correlation.
Figure 1D:
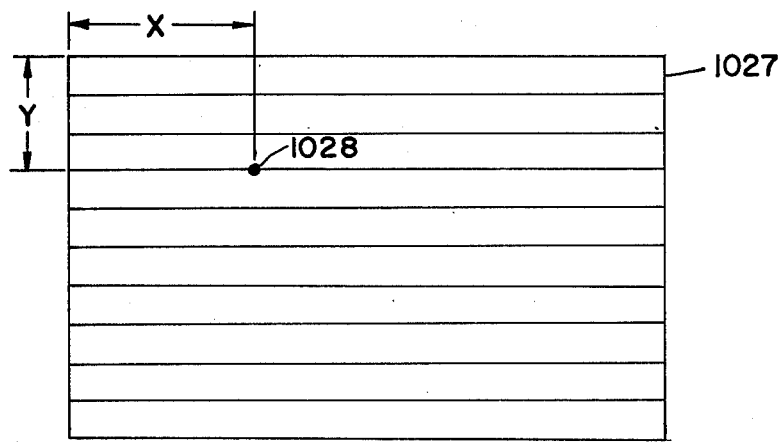
FIG. 1D is an illustration of a specific point in a field of scan.

The measurement significance of positioning of the X and Y coordinates determined by X and Y coordinate counters 105X and 105Y, respectively, in FIG. 1A is seen in FIG. 1D. The position of a specific point 1028, having a coordinate marked Y and a coordinate marked X, is uniquely defined within the field of scan 1027.

Controller 130 controls the functions of the blocks in FIG. 1A. These include the selection of a signal for line 112 from data selector 111, resetting and initializing address counter 109, selecting the appropriate output intercept logic 102 from multiple intercept logic functions and selection of multiple measurement logic 121 functions. In general, the controller 130 nominates the initial field of scan and successive measurement fields of scan, sets up appropriate initial conditions for these fields and maintains control conditions during these fields.

On a measurement field of scan, following the initial field of scan during which X and Y indexing data was accumulated in memory 108, a signal occurring on line 120 related to the video signal is processed by measurement logic 121. The signal on line 120, for example, may correspond to the video signal from the television camera, for example, the signal on line 13 in FIG. 3 of U.S. Pat. 3,805,028, or the binary video signal defining interceptions by scan lines of the feature in the field of view, from the threshold circuit, for example, circuit 53 in FIG. 3 of U.S. Pat. No. 3,805,028.

Figure 4A:
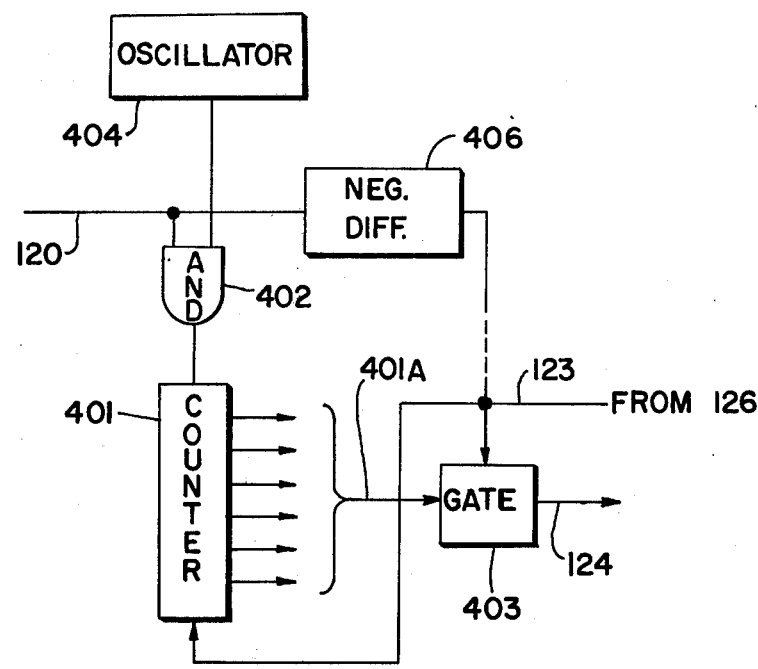
FIG. 4A is an illustration of a logic circuit relating to a parameter of the feature intercept.

A specific example of a measurement logic 121 circuit implementation to produce data corresponding to the length of individual intercepts of the binary video signal on input line 120, is shown in FIG. 4A. When the input line, corresponding to the binary video signal, is asserted, indicating that the scan line is intercepting a feature, the pulses from the oscillator 404 are passed through AND gate 402 to cause counter 401 to count for the duration of the intercept pulse on line 120. At the conclusion of the intercept pulse, the counter 401 outputs, on line 401A, data corresponding to the length of the intercept. This data passes along line 401A to AND gate 403. When an input at line 123 appears from comparator 126 of FIG. 1A as described in the following paragraph, the output from counter 401, corresponding to the length of the intercept pulse, passes through multiple AND gate 403 to line 124 which is an output of measurement logic 121 of FIG. 1A. The following edge of the signal on line 123 from comparator 126 of FIG. 1A then resets counter 401 in preparation for the next intercept. Optionally, the signal of line 123 may be controlled from differentiator 406 which produces a short positive pulse on each falling edge of the input binary video signal on line 120, in which case the connection via line 123 to comparator 126 may be deleted. Examples of alternative configurations to implement other measurements in the measurement logic circuit 121 are discussed hereinafter.

Measurement field scans occur subsequent to the initial field scans during which the X and Y coordinates of index points are stored in memory 108. On a measurement field the memory 108 is placed in the read mode by controller 130 so that the contents of the memory 108 pass through line 125 to the comparator 126. At the beginning of the measurement field, counter 109 is reset to its initial value by controller 130. This initial value corresponds to the address of the first X and Y location transferred into memory 108 during the initial field of view over which index point coordinates were extracted. On the measurement field, X and Y coordinate signals of stored index points appear, from the memory 108, on output line 125 as an input of the comparator 126. Simultaneously, the X and Y coordinates of the scanning spot appear from X and Y coordinate counters 105X and 105Y respectively through line 106A to a second input to comparator 126. The output line 123 of comparator 126 signals the equality between the X and Y coordinates on line 106A and the value of the X and Y coordinates of the index points from memory 108 by the presence of a pulse on line 123. This pulse passes to the measurement logic 121. This pulse may either be used to cause the transfer of measurement data from measurement logic 121 on line 124, or it may simply identify the presence of index related data occurring, in this case on line 124, as a result of generating by measurement logic 121. In this case data is deemed to be index related, based on the simultaneous occurrence of an index point signal on line 124 and the data of line 123. The enabling input to the measurement logic 121 is not necessary in this case. The simultaneous occurence may also include the sending of the address of index pulse of line 110 for further identification. A final alternative may be the generation of a signal such as a delayed pulse from the index point or a binary signal having transitions at the occurrence of each index point. Such a binary signal may be used to enable, inhibit or otherwise modify the video signal on line 120 by the insertion of logic on line 120 to modify the video signal based on the occurrence of the binary signal derived from the index points. Thus, specific features may be selectively included or excluded based on selected index points.

Referring to the measurement logic in FIG. 4A, as hereinbefore stated, the value of counter 401 containing the length of intercept information, is then passed through multiple AND gate 403 through output 124 of the measurement logic 121. Thus, data keyed from the predetermined index points is released on output line 124, along with the index signal 123 and optionally includes the address counter output line 110, including an identifying number for the specific point from which the data is released.

Other data identifying the specific measurement is the X and Y coordinates of the index point on line 125. Output data from lines 124, 123 and 125 may be used singularly or in combination in conventional arithmetic hardware or computer means to correlate data from individual index points extracted on successive fields of view to produce composite measurements from each point. Operator control means may program the sequence of controller 130. Alternatively, the data on line 124 may be sorted into distributions or statistically processed.

Measurement data has a value which can define some parameter of the video signal in the vicinity of the point. A point for the purposes of this invention is generally identified by its geometric definition and is in general in the preferred embodiment considered as a specific position on a given scan line.

Figure 3B:
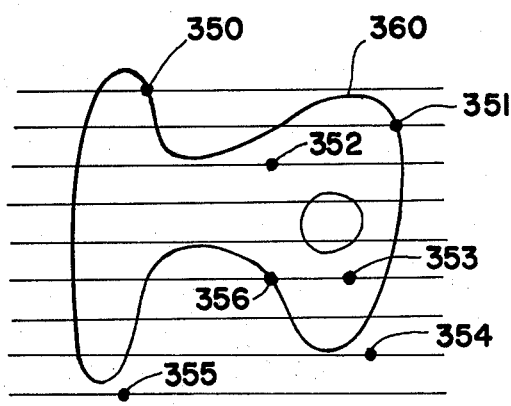
FIG. 3B illustrates a feature identifying selected points for determining feature measurement parameters.
Figure 4B:
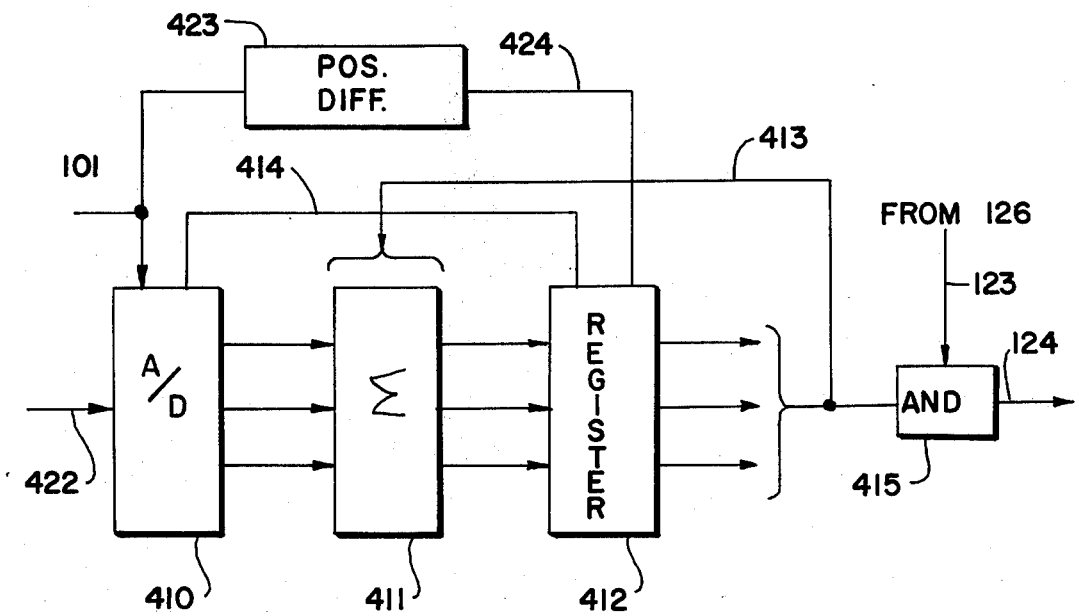
FIG. 4B is an alternate configuration of the logic circuit of FIG. 4A.

An alternative configuration of the measurement logic 121 is shown in FIG. 4B, where line 101 corresponding to scan line interceptions of features represented by the binary video signal controls an analog to digital (A/D) converter 410 receiving the video signal on line 422, for example from line 13 of television camera 10 in FIG. 3 of U.S. Pat. No. 3,805,028, and performs a analog to digital conversion to digitize the amplitude of the video signal at predetermined intervals. During the time that the intercept line 101, carrying the binary video signal, is asserted, corresponding to specific feature intercepts, successive digitizations are fed into a summing circuit 411 which sums together data from register 412 with data from A/D converter 410 and passes the sum into a register 412 to feed through line 413 to the other input of the summer 411. A clock pulse corresponding to the points of which digitization occur on a line 414 from the A/D converter 410, strobes register 412 to load the output of the summer 411 into register 412 a brief period after each digital to analog conversion is completed by A/D converter 410. Thus, register 412 contains the sum of the digitized amplitudesor integrated video amplitudes of the A/D converter accumulated over the period during which the binary video signal on line 422 is asserted by summer 411 in conjunction with register 412.

The output of the register 412 also feeds the multiple AND gate 415 to output the integrated video amplitude data when the equality signal on line 123 from comparator 126 of FIG. 1A occurs. Differentiator 423, similar to that shown in FIG. 2A, produces on line 424, a pulse corresponding to the positive transition of each intercept outlined. This is used to reset register 412 to zero at the beginning of each intercept.

As already indicated, the controller 130 in FIG. 1A is to control the operation. Specifically, it controls the signals which determine whether a field is to be one for which data is to be extracted and whether the data to be extracted is the X and Y coordinate information which is passed into memory 108 or whether the field is to be one in which the memory 108 reads coordinate information and controls the flow of measurement data on line 124.

Additionally, it determines which of the possible output signals intercept logic circuit 102 is to place a pulse on line 103 and the specific measurement to be outputted on line 124 by measurement logic 121.

The controller 130 also ensures that the correct input pulse is selected by data selector 111. Thus as seen in FIG. 1A, from comparator 126 the signal of line 123 passes through data selector 111 to line 112 to increment address counter 109 during a measurement field. The controller 130 may also be used to determine the value to which the X coordinate counter 105X is reset at the beginning of a scan line and the value to which the Y coordinate counter 105Y is reset at the beginning of a field of scan. Changing the value to which the X and Y counters 105X and 105Y, respectively, are reset, to be different for the initial field of scan compared to that reset value used on the measurement fields, permits a displacement of the position of the pulse from comparator 126 indicating when equality occurs on line 123 and therefore provides a delay for any processing which may occur in the measurement logic 121. The controller 130 also controls whether memory 108 is in a read or write mode.

FIG. 1B shows a block diagram of a system similar to that in FIG. 1A. It includes two system techniques for modifying or qualifying the X and Y coordinate index point list stored in memory 159 so that only data is keyed from the measurement logic 154 by selected or qualified index points on measurement fields of scan subsequent to the time at which the memory 159 is modified. This modification of index points takes place after the initial field of scan during what is called a qualifying transfer.

Qualifying transfers take place after an initial field of scan, but before a measurement field of scan to qualify index points which are to key data during the specific measurement field of scan. Thus selected index points can key data, each on a different measurement field of scan, as determined by the qualifying transfer under control of controller 130. The apparatus shown in FIG. 1B permits two types of qualifying transfers. One type, termed a coordinate qualifying transfer qualifies or selects index points based on their X and Y coordinates. The other type, termed a measurement qualifying transfer, selects index points based on measurements keyed on a previous measurement field scan to the index points.

The block diagram of FIG. 1B, is essentially similar to the block diagram of FIG. 1A. One of a number of exceptions is that a coordinate sequencer and spacing logic 151 has been added which may, for example, (a) select either the odd numbered index point coordinates and the even numbered coordinates, or (b) select those index point coordinates based on relative positions. For example, it can select those index points spaced closer than a certain amount in the X direction to its previous index point, that is, an index point occurring on the same line having an X value difference less than a predetermined amount to the previous index point or (c) select one set of index points fron another using criteria such as the position of the index point within a predefined region of the field of view, or within a predetermined distance of a point in the field of view.

A qualifying bit modifier block 152, receives the index point X and Y coordinate data from the memory 159 while in the read mode during a field of scan subsequent to the initial field of scan and classifies the index point data word. This is done, for example, as shown in FIG. 1C, wherein each index point is stored as index point coordinate information comprising a group of binary bits called a word, subdivided into three parts. The first part labelled 190 comprises, for example, 10 binary bits which form in binary format the number corresponding to the Y coordinate of the index point, while 10 other bits in the same word labelled 191 contain the X coordinate of the index point. Two remaining bits 192 and 193 are used to indicate, in combination, conditions regarding this index point word. These conditions are set and modified by the qualifying bit modifier 152 based on the information generated in the coordinate sequence and spacing logic 151 based on the coordinate index point information presented on line 162 from the memory 159, in the case of coordinate qualifying transfers, or by comparator 155 in the case of measurement qualifying transfers.

One example of the implementation of the coordinate sequence and spacing logic 151 used in a coordinate qualifying transfer is as follows. The index points can be identified, from the start of the field of scan with a number where odd numbered index points may be identified from even numbered index points. Then bit 192 can be set to zero in the hardware for the even numbered index points and bit 192 can be set to one for odd numbered index points. Bit 193 need not be changed. The exemplary word of FIG. 1C, for example, is then transferred back into the random access word organized memory 159 including the identifying bits.

Figure 1E:
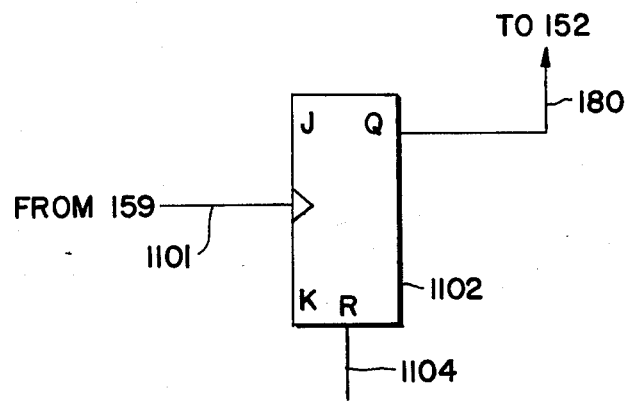
FIG. 1E illustrates a circuit for implementation of the coordinate conditioning logic of FIG. 1B.

FIG. 1E illustrates an example of the implementation of the coordinate sequence and spacing logic 151 of FIG. 1B to separate even numbered coordinates from odd numbered coordinates. A pulse enters on line 1101 derived from memory 159 of FIG. 1B. This pulse occurs whenever a new location is read out of memory 159. Such a signal is normally associated with the data transfer line 162 from memory 159 to coordinate sequence and spacing module 151 and indicates when data is present on the lines. This pulse causes a J-K flip flop 1102 to toggle, producing at its Q output on line 180 a signal which is positive after every second pulse on line 1101. The J-K flip flop 1102 is reset at the beginning of each field of scan through line 1104 thereby ensuring that, whenever the number of pulses, which corresponds to index points read from memory 159, occurring on line 1101 after the reset has occurred on line 1104, is even, the signal on line 180 is down or in the zero state. Conversely if the number is odd, the signal on line 180 is asserted or in the positive state.

Alternatively every third, fourth or fifth coordinate entry can be identified using the output of a radix 3, 4 or 5 counter and presetting the initial value of the counter appropriately.

This technique overcomes the problems which may arise from closely spaced features, since if, for example, the number of data transfers for measurement fields of scan is to be limited to less than the number of index points per field, one measurement field may permit transfers from odd numbered index points while further measurement field produces transfers from even numbered index points.

A further implementation of the coordinate sequencing and spacing logic 151 permits a light pen to qualify index points as follows. The use of a light pen for selecting objects in the field of view has been disclosed in U.S. Pat. No. 3,805,028 already referenced. The light pen, as described in Section II at Column 19 of the referenced patent is used to generate a pulse on line 80 of FIG. 3 thereof, whenever the scanning spot or the television monitor passes beneath the photo-sensitive top of the pen. This pulse may be fed to the input 180 of the qualifying bit modifier 152. Thus, there is performed a coordinate qualifying transfer in synchronism with the scanning operation, by driving memory address counter 160 of FIG. 1B hereof from line 169 via data selector 172 so that memory 159 reads out in the same manner as during a measurement field scan. The index point or points lying under the light pen pattern occurring on line 80 of the reference will receive a different value qualifying bit than those outside the pattern. Consequently, the index point is selected dependent on its position in relation to the light pen.

In this alternative inplementation the coordinate sequencing logic corresponds in fact to the particle selector 79 of FIG. 3 of the referenced patent U.S. Pat. No. 3,805,028.

Figure 1F:
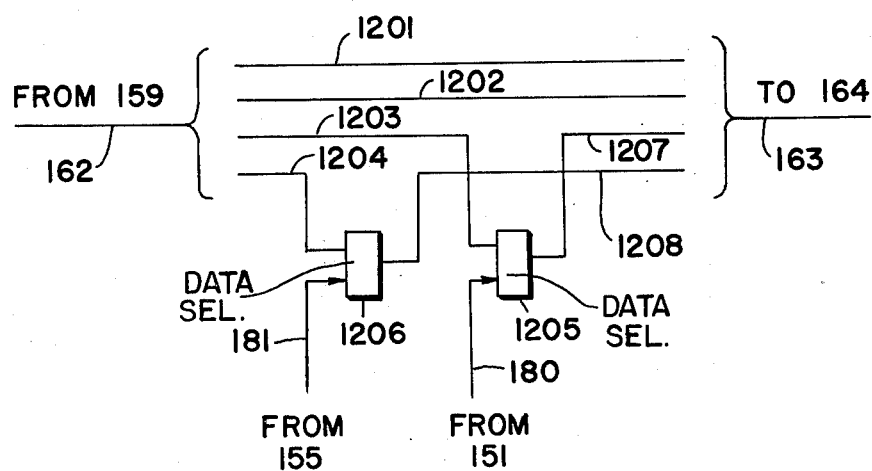
FIG. 1F illustrates a data word qualifying circuit.

FIG. 1F shows an implementation of the qualifying bit modifier 152 in FIG. 1B. The line 162 entering comporises a group of signals corresponding to the specific bits identified in FIG. 1C. One group of signals corresponds to the Y group and these can be broken into Y signal paths designated by line 1201. The second group of data corresponding to X information will be carried on X signal paths designated by line 1202. Signal paths designated 1203 and 1204 carry the information corresponding to bits 192 and 193 of the data word as shown in FIG. 1C. To set bit 192, data selector 1205, which is under control of controller 157 as illustrated in FIG. 1B, is initialized by the controller to pass data during a coordinate qualifying transfer from the coordinate sequence and spacing logic 151 on line 180 in FIG. 1B. Similarly, data selector 1206, under the control of controller 157 is initialized to select either input 1204 corresponding to the previous value of bit 193, or line 181 which will contain from comparator 155 of FIG. 1B the new value of bit 193. The outputs of the data selectors 1205 and 1206 appear on signal path 1207 and 1208, respectively, corresponding to the new values of bits 192 and 193, respectively. This combination of signal paths then combines into line 163, which passes into data selector 164 and thus to load memory 159, with index point coordinates having modified qualifying bits. During a qualifying transfer, controller 130 ensures that memory 159 alternatively reads out through line 162 and stores through line 163 the index coordinate data.

Additional blocks in FIG. 1B, when compared to FIG. 1A, include memory 153 of a type similar to memory 154, which stores the measurement logic data transferred from the measurement logic unit 154, corresponding to the measurement logic 121 discussed with respect to FIG. 1A. Memories 153 and 159 may be random word organized access memories with nondestructive read capability. Data to be stored is entered on line 155A at an address determined by line 161 from address counter 160. In the read mode, memory readout data is outputted on line 156. Read and write modes for memory 153 are selected by controller 157 whose functions include those outlined for controller 130 in FIG. 1A. A measurement field similar to that described previously with reference to FIG. 1A loads memory 153 from measurement logic 154 on line 155.

During a measurement qualifying transfer, comparator 155, receives on line 156 memory data from memory 153. This comparator 155 compares the data, as it is read out from memory 153, with a preset value determined by the controller 157 through line 158. The memory 153 is read out so that there is a correspondence between its readout, and the readout of the X and Y coordinate memory 159, which is the same as the X and Y coordinate memory 190 in FIG. 1A except for the requirements to store the additional qualifying bits. This correspondence occurs because the memory address counter 160, which is similar to counter 109 of FIG. 1A, connects through line 161 to both memory 159 and memory 153. The output from comparator 155 on line 181 is used to modify index point coordinate data passing on line 162 to the coordinate word modifier 152. That data then passes on line 163 through the data selector 164 to be reloaded into the memory 159 in its modified form.

Thus, on measurement fields of scan the index point coordinate data with modified qualifying bits, is outputted to comparator 166 which is similar to comparator 126 of FIG. 1A, with the exception that comparator 166 examines the qualifying bits 192 and 193 entering on line 162 and determines if they match the qualifying bits on line 167 from controller 157. If both the X and Y coordinates on line 162 match the X and Y coordinates on line 168 and if the qualifying bits on line 167 match the qualifying bits in line 162, a pulse is generated on line 169 from comparator 166. In the same manner as in FIG. 1A, a pulse is generated on line 169, as on line 123, to indicate a coincidence and therefore to index data from the measurement logic 154. Thus, data is only transferred from measurement logic 154 when required, based on both X and Y coordinate information together with qualifying bit information. Consequently, depending on how the qualifying bits are set for each word in memory 159, there is determined which transfers of data from the measurement logic are permitted.

Other items in FIG. 1B are essentially the same as those in FIG. 1A. Intercept information, for example, enters on line 101, as described before, to intercept logic 170 which corresponds to logic 102 and the pulses corresponding to the occurrence of specific intercept events, as determined by intercept logic 170, pass through line 171 to data selector 172 to increment through line 173 the memory address counter 160. Specifically, in the initial field of scan, a pulse occurs on line 171, and gate 174 is opened and X and Y coordinate counters 175X and 175Y, corresponding to 105X and 105Y in FIG. 1A, driven by synchronizing pulses on line 176, generate X and Y coordinate information on line 168 which is passed from multiple AND gate 174 to data selector 164 controlled by controller 157 to be loaded into memory 159 at an address determined by counter 160.

With respect to FIG. 1B, lines 155A, 156, 161, 162, 163, 164A, 168 and 174A all correspond to multiple paralled data paths.

Subsequent to the initial field of scan, a coordinate qualifying transfer may take place as supervised by controller 157. The purpose of a coordinate qualifying transfer is to examine the X and Y coordinates of all index points stored in memory 154 using the coordinate sequence and spacing logic 151 to modify a qualifying bit based on the results of this examination. Controller 157 causes memory 159 to output data to the qualifying bit modifier 152, and the index point coordinate data together with the modified qualifying bits then pass through line 163 and through data selector 164, under control of controller 157 to be rewritten in memory 159. Modification of the qualifying bits during such a transfer is determined by controller 157 controlling coordinate sequencer and spacing logic 151, and the data selectors 1206 and 1205 of FIG. 1F in the qualifying bit modifier 152 by presetting the conditions under which the modification of the qualifying bits is to occur. Line 180 from coordinate sequencing and spacing logic 151 dictates the value of a qualifying bit to modifier 152.

A qualifying transfer may take place synchronously with the scan or may be asynchronous. In the asynchronous case the clock to drive memory address counter 160 comes from the controller 157 via line 180 and data selector 172 and line 173 to increment the address counter 160 through all the address locations occupied by the index point coordinates.

On a measurement of scan, measurement logic 154 may perform specific measurement functions in response to the intercept or video signal on line 120. The resulting data is keyed or transferred on an index pulse from comparator 166, passing through line 169 to the measurement logic 154, in a manner similar to that already discussed to select the data only from those points in the field of view whose coordinates, as outputted from memory 159, have the correct qualifying bit as determined by comparator 166. This data is then passed into memory 153 through line 155A into those locations of the memory 153 determined by the memory address on line 161. Note that because the memory 159, reading out the index point coordinate data has the same address as memory 153 storing the measurements, the location at which a specific measurement is stored in memory 153 corresponds to the location of the X and Y coordinates of the index points keying the specific measurement from memory 159. Subsequently, controller 157 may initiate a measurement qualifying transfer in which a qualifying bit in memory 159 is modified based on a comparison between the measurement in memory 153 and a preset value determined by controller 157. This measurement qualifying transfer occurs when controller 157 causes memory 153 to read its contents onto line 156 where comparator 155 compares the data with that on line 158 and generates a signal to further modify a qualifying bit through line 181. As memory 158, synchronously with memory 153, outputs its X and Y coordinate data on line 162 into the qualifying bit modifier 152, the modifier 152 responds to the comparison information on line 181 and passes the X and Y coordinate data back into data selector 164 to be stored in memory 159 with a qualifying bit modified, based on the data in line 181. As a result, each index point coordinate data word in memory 159 has its qualifying bits modified as a consequence of the value of data extracted from that index point.

A number of different circuit embodiments of intercept logic 102 of FIG. 1A or 170 of FIG. 1B produce outputs in response to different points of the image. These circuits may be included in the intercept logic circuitry and their appropriate outputs selected onto lines 103 or 171 depending on the control output from controller 130 or 157. Examples of these circuits are shown in FIG. 2B and 2C.

Figure 2B:
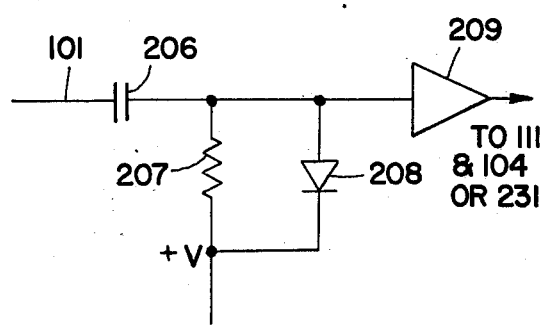
FIG. 2B illustrates a circuit for generating a signal identified to a feature intercept.
Figure 2C:
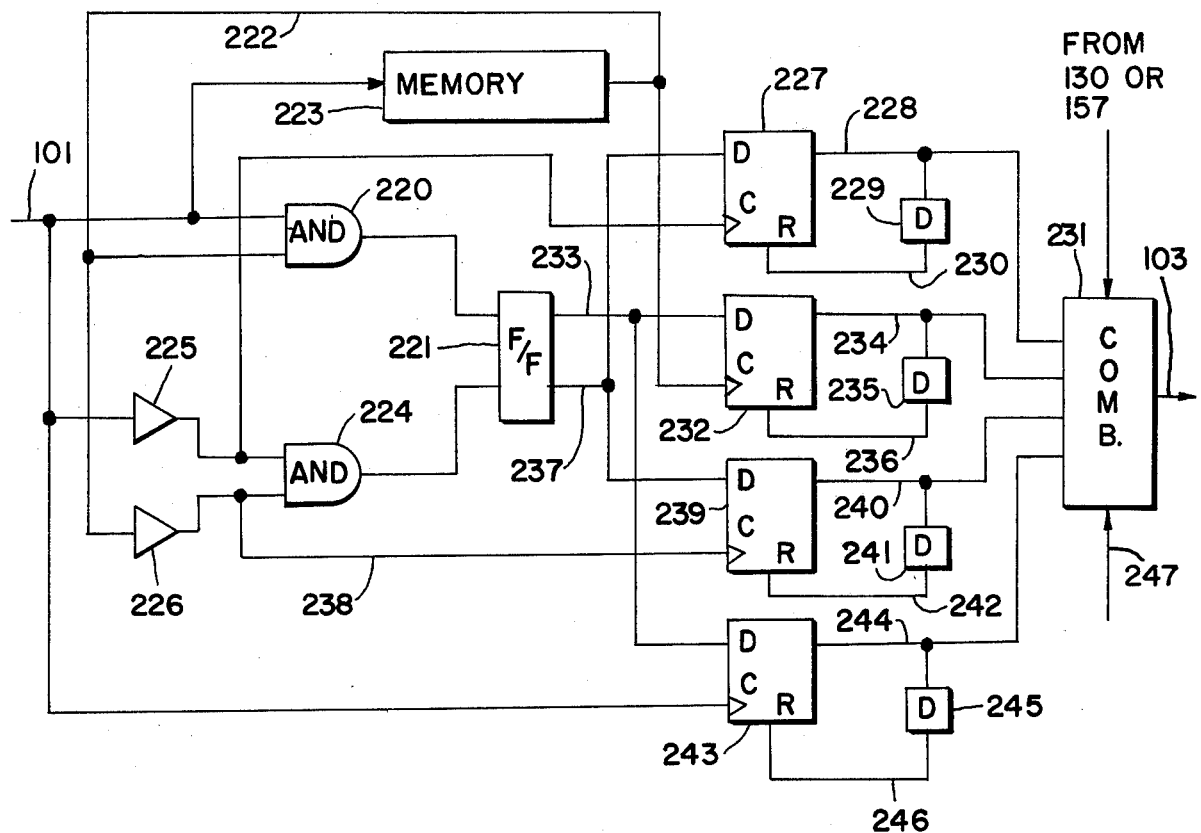
FIG. 2C illustrates a block circuit for determining the circuit points illustrated in FIG. 3B.

FIG. 2B shows a circuit for generating a positive pulse from the falling edge of the binary video signal representing the intercept on line 101 by means of capacitor 206, resistor 207, diode 208 and inverter 209 to correspond to coordinates transferred into memory at the trailing edge such as points 330 through 334 of the feature 310 illustrated in FIG. 3A.

It is sometimes desired to transfer information concerning X and Y coordinates of topologically identifiable points of the feature. Such points include the points in which the upper positive tangent is formed such as point 350 or 351 on FIG. 3B or the point at which the upper negative tangent with a horizontal scan line is formed such as point 352 or 353. The lower positive tangent points of features within the field of view include, for example, point 354 and point 355 in FIG. 3B and the lower negative tangent points include points 356 and 357 on FIG. 3B.

The term upper positive tangent arises because the point is associated with a point on a feature at which a tangent between the boundary of the feature and a line parallel to the scan lines can be formed on the upper side of the feature on a boundary of positive curvature. Other tangent points are defined in a similar manner.

FIG. 2C illustrates how the points of FIG. 3B may have been logically determined. Intercept signal on line 101, which is asserted or positive with the interception of a feature and zero otherwise, is fed into AND gate 220 to set-reset flip flop 221, whenever a signal on output line 222 from line to line memory 223 which has a duration approximately equal to one line scan, is also positive. Alternatively, set-reset flip flop 221 is reset through AND gate 224, whenever the output of line-to-line memory 223 on line 222 is set to zero, simultaneously with the input on line 101 being zero through inverters 225 and 226, each of which respectively operates through AND gate 224.

A/D type flip flop 227 of FIG. 2C receiving the negative output on line 237 from flip flop 221 onto its D or data input and the inverted delayed signal on its clock input produces a positive output on line 228 whenever a positive transition on its clock input simultaneously occurs with a positive level on its D input. This signal is passed through a short delay 229 and through line 230 to reset the flip flop 227 by bringing output 228 to zero. The resulting pulse passes to a combiner 231.

Flip flop 232 produces a positive output on upper negative tangents points such as points 352 and 353 in FIG. 3B. These occur whenever output line 233 from set and reset flip flop 221 is high when a positive transition on line 222 occurs. Flip flop 232 produces a positive pulse corresponding to upper negative tangent points such as points 352 and 353 of FIG. 3 by delaying the positive output short delay 235 and passing it through line 236 to the reset terminal of flip flop 232 to reset flip flop 232 and complete the pulse on 234. Line 234 is also passed to combiner 231 where it is combined with other pulses under the control of controller 130 or 157.

Similarly, by sensing the state of the negative output of set and reset flip flop 221 on line 237 and receiving a positive transition through line 238 from inverter 226, flip flop 239 produces a positive output on line 240 at positions corresponding to lower positive tangent points 355 and 354 of the particle of FIG. 3B. The flip flop 239 is reset by line 242 from short delay 241 and produces a pulse on line 240 passed to combiner 231.

Finally, the lower negative tangent points, such as 356 and 357 of the particle of FIG. 3B, are detected by flip flop 243 having inputs from sensing line 233 and line 101. There is produced a positive transition on line 244 which is passed to combiner 231 and also to short delay 245 which through line 246 resets flip flop 243.

Combiner 231 may also receive additional types of intercept logic signals on line 247 from the outputs of other intercept logic sources, for example, the output of the circuit of FIG. 2A at line 204. Controller 130 (or 157) determines which of the input signals to combiner 231 are outputted on intercept logic output line 103, depending on the specific field of scan.

Continually throughout the specification specific disclosure and functional operation of the controller 130 has been presented. The following summarizes that disclosure. In general, the controller 130 nominates the initial field of scan and successive measurement fields of scan, sets up appropriate initial conditions for these fields and maintains control conditions during such fields. In so doing it controls the functions of the blocks in FIG. 1A, which specifically include the section of a signal for line 112 from data selector 111, resetting and initializing address counter 109, selecting the appropriate output intercept logic 102 from multiple intercept logic functions and selection of multiple measurement logic 121 functions.

The operation of the controller unit 130 is sufficiently flexible for a selectable operator control means to program the sequence of the controller 130. In controlling the operation, the controller 130 controls the signals which determine whether a field of scan is one for which data is to be extracted and whether the data to be extracted is the X and Y coordinate information which is to be passed into memory 108 or whether the field is one in which the memory 108 reads coordinate information and controls the flow of measurement data on line 121. Further, controller 130 may determine the value to which the X coordinate value 105X is reset at the beginning of a scan line and the value to which the Y coordinate counter 105Y is reset at the beginning of a scan line.

Controller 130 also controls whether the memory 108 is in a read or write mode. Likewise, read and write modes for memory 153 are selectable by controller 157.

An example of a specific event in the field of view for which a specific type of signal is selectable by controller 130 is illustrated with respect to FIG. 2A, where line 101 entes the positive differentiator to form a signal on line 104 on the leading edge of a feature when the signal on line 101 corresponds to a positive going transition derived from feature intercepts. In the initial field of scan, which is nominated by the controller 130, coordinate data of indexing points is stored in memory 108. Memory 108 is placed in the store mode by the controller 130. At the completion of the initial field of scan, memory 108 contains the X and Y coordinate information of the field of view event because of the operation controlled by controller 130. Qualifying transfers take place after the initial field of scan, but before a measurement field, to qualify index points which are to key data during the specific measurement field of scan. The controller 130 thereby controls the keying of data from different measurement field of scans. During such operation the controller 130 controls the read-out of X and Y coordinate memory 159. In the measurement field, memory 108 is placed in the read mode by the controller 130 so that the contents of the memory 108 appear at comparator 126 for comparison with the X and Y coordinates of the scanning spot from coordinate counters 105X and 105Y. As will be appreciated, the operation of controllers 130 and 157 are similar.

A further implementation of intercept logic circuit 102 is shown in FIG. 2D. In this case, the index point coordinate data to be stored is limited to occurring on feature intercepts occurring on selected lines or points in selected areas of the field of view. However, those intercept points occurring on unselected lines are stored until a line occurs which permits the occurrence of such points. A counter 270, incremented by a scan line synchronizing pulse entering on line 271 produces an output on line 272 during one line in every N lines where N may be any number. Alternatively, the input to counter 270 may be clock pulses defining X coordinates of the scan or other signals indicating a preferred transfer time.

The intercept information enters on line 101 and passes to either a leading edge detection circuit, such as shown in FIG. 2A, or a trailing edge detection circuit, as shown in FIG. 2B, or a combination of both in block 275 of FIG. 2D. The output pulses then pass to the output 103 of intercept line logic circuit 102 through OR gate 274, a gate 281 and line 282 provided the output of counter 270 indicates that this is a selected transfer time. The output of circuit 275 also alternatively passes to a line to line memory 276 via gate 280 if the output counter 270 indicates that this is not a selected transfer line. The output of the line-to-line memory 276 passes through line 277 and is fed to gate 274 to pass back into the memory 276 or through output line 103 depending on the output of counter 270. Thus, if a signal on line 282 occurs when line 272 is not asserted, the signal is in effect further extended until the next line. If, however, a signal simultaneously appears on line 272, a final signal goes out on output line 103.

The purpose of gate 280 receiving the signal of output line 272 is to inhibit the transfer into the memory 276 on those lines which are selected. The purpose of gate 281 is to inhibit a transfer on line 103 on those lines which are not selected. Gate 281 inhibits the intercept information on unselected lines as influenced by the signal of line 272.

Figure 5:
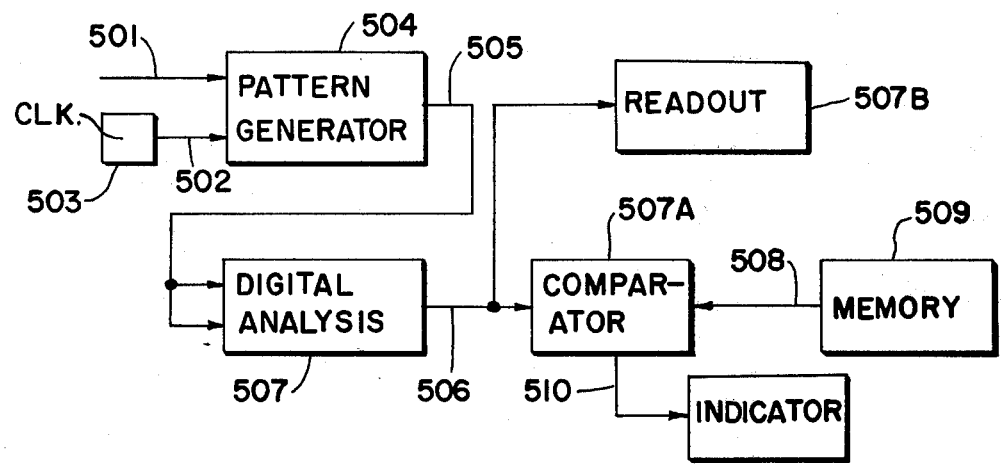
FIG. 5A illustrates a block diagram for checking accuracy and calibration of an image analysis system.
FIG. 5B illustrates a circuit for implementing pattern generation for use in the circuit of FIG. 5A.
FIG. 5C illustrates an alternate circuit for implementing pattern generation for use in the circuit of FIG. 5A.
Figure 5B:
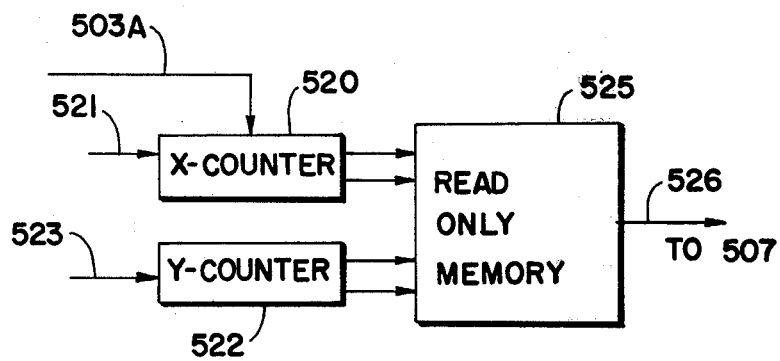
Figure 5C:
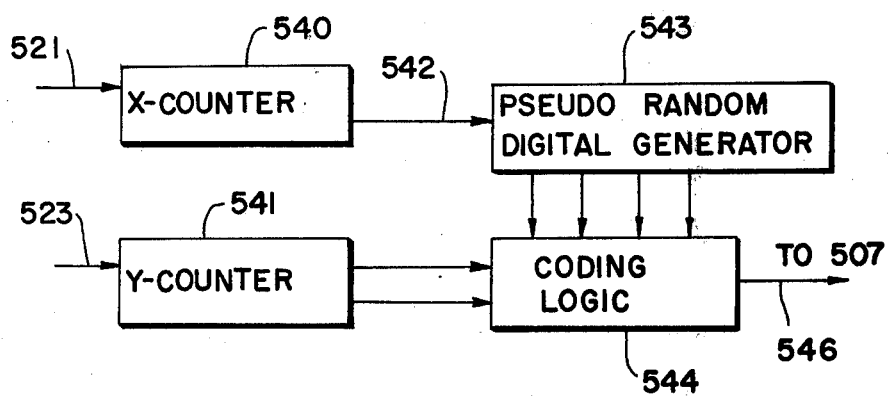

Another aspect of this invention is shown in FIGS. 5A, 5B and 5C. In a complex system it is often necessary to provide some form of checking to ensure correct operation. In the present invention, this technique involves generating electronically, signals representing video signals generated from an image. Because of the electronic nature of the generation of a test pattern, the dimensions of any image which the pattern could be taken as representing, are accurately known independent of the magnification and performance of the television scanner. Thus, these signals provide an accurate method for determining the overall performance of the system by substituting for the image derived video signals, electronically generated video or binary video signals using the system to perform measurements on these signals as if they were objects in the field of view. These measurements may then be compared with the known accurate result.

FIG. 5A show the functional blocks associated with the technique for ensuring correct operation and calibration of the system. Synchronizing signals associated with vertical and horizontal sweeps of the scan of the field of view and clocking signals used in other parts of the system or locally generated enter on lines 501, and 502, respectively. With respect to reference U.S. Pat. No. 3,805,028, the synchronizing signals will be generated from the sweep circuits associated with television camera 10 thereof.

The synchronizing signals entering on line 501, together with pulsing signals on line 502, generated by clock 503, enter pattern generator 504 which generates a signal on line 505 corresponding to a binary video signal. This signal corresponds to the binary video signal which would normally be generated when measuring images by the threshold circuit used in conjunction with the television camera reference in U.S. Pat. No. 3,805,028. The signal would correspond to the signal generated by threshold circuit 53 in response to the video signal of television camera 10 occurring on line 13. This signal has a sequence such that if it was displayed on television monitor, for example, television monitor 14 of U.S. Pat. No. 3,805,028, it would appear as a high contrast image of some object or shapes. This signal, substituting for the binary video signal, enters a digital analysis circuit 507 such as that shown in FIG. 1B hereof, where the line 505 enters at the points in the circuit shown as 101 and 120 of FIG. 1B.

The digital analysis circuit 507 performs measurements on the images and outputs measurement results on line 506 corresponding for example, to line 155A of FIG. 1B. A comparator 507A receives these signals and compares the value of the measurement signals with signals on line 508 from memory 509, which signals correspond to the values which result when the apparatus is operating without fault.

Should the comparator detect that any one of the measurements on line 506 differs by more than a predetermined amount from the corresponding measurement from memory 509 appearing on line 508, comparator output line 510 generates a signal which is used to indicate to the operator that the measurements made by the system are not within specification.

Alternatively, line 506 connects to a readout means 507B where the operator may visually observe the results of the measurements on the electronically generated test image and compare these results with known correct values.

FIG. 5B shows techniques for implementing the pattern generator 504 in FIG. 5A. Synchronizing signals of FIG. 5A enter X counter 520 on line 521 and Y counter 522 on line 523. The signal from oscillator 503 of FIG. 5A are shown as entering on line 503A in FIG. 5B and are used to increment the X counter 520 at a predetermined rate. The Y counter 522 is incremented through synchronizing signals on line 523. Thus, in a manner as hereinbefore described, the output of the X and Y counters 520 and 522, respectively, correspond to the equivalent of the X and Y coordinates of the scanning spot. The outputs of these X and Y counters are used as addresses on read only memory 525 which, when addressed by the X and Y counters 520 and 522, respectively, in combination, produces a predetermined binary pattern on line 526 corresponding to the desired electronic test image. Memory 525 may be a random access or read only single bit memory into which there has previously been stored or constructed the date corresponding to the desired binary video signal pattern.

An alternative technique is to employ a read only memory with a multiple number of bits of data and perform a digital-to-analog conversion on the multiple output data bits to form an electronically generated analog signal corresponding to the video signal generated by the television camera.

FIG. 5C shows an alternative technique for implementing the pattern generator of FIG. 5A and 5B. An X counter and a Y counter 540 and 541, respectively, perform in the same manner as X and Y counter 520 and 522 in FIG. 5B. A single output from X counter 540 at a suitable frequency enters a pseudo-random digital generator 543 on line 542. The psuedo-random digital generator 543 may be a shift register connected as a Johnson ring or some other pseudo-random digital device. The parallel outputs from the psuedo-random digital generator are coded into coding logic logic 544 which simultaneously receives Y information from Y counter 541 producing in combination on line 546 a binary video signal corresponding to the electronically generated test image on line 505 of FIG. 5A.

It is claimed:

1. An image analysis system for processing data extracted from an image across a field of view using repeated scans of the image, comprising:
   means for producing a video signal as a function of the image;
   means for producing a binary signal as a function of the video signal;
   means for extracting data from the binary signal to define a position of a point within the field of view;
   means for storing the data defining the point; and
   means employing the stored data during a subsequent scan of the image for identifying data generated as a function of the video signal during the occurrence of the subsequent scan, at the defined point by comparing the data defining the position of the point within the field of view with the position of the scan at which the video signal is used to generate further data.

2. A system for processing data extracted from an image across a field of view using repeated scans of the image, comprising:
   means for producing a video signal as a function of the image;

means for producing a binary signal as a function of the video signal;

means for extracting data from the binary signal to define a position of a point within the field of view;

means for storing the data defining the point; and means employing the stored data during a subsequent scan of the image for controlling the transfer of data generated as a function of the video signal during the occurrence of the subsequent scan and corresponding to the defined point by comparing the data defining the position of the point within the field of view with the position of the scan at which the video signal is used to generate further data.

3. An image analysis system scanning an image in a field of view, comprising:

means for generating a video signal as a function of the image;

means for defining a point within the field of view as a function of the video signal;

means for storing positional data generated as a function of the point within the field of view;

means for comparing the positional data with data generated as a function of the position of a scan on a subsequent field of view and generating a release signed as a function of the comparison; and means for releasing the generated data as a function of the release signed during a scan of the field of view subsequent to the storing of the data.

4. An image analysis system, as defined in claim 3, further comprising:

means for defining a new position within the field of view a predetermined distance with respect to the position of the point within the field of view for controlling data corresponding to the new position generated as a function of the video signal.

5. In an image analysis system means for evaluating the accuracy of the operation of the image analysis system comprising:

means for electronically generating a predetermined reference video signal corresponding to an image having a known measurement, the reference signal simulating a signal derived from scanning an image;

means for performing a measurement on the electronically generated reference video signal; and means for evaluating the measurement to compare it with the known measurement.

6. An image analysis system for scanning an image of an object in a field of scan displayed on a television monitor having a light pen to select predetermined points in the field of scan comprising, light pen means to produce a signal in response to the relative position of the scanning spot on the television monitor, means for generating data as a function of the signal produced by the light pen corresponding to the position of the light pen within the field of scan, and means for selecting points within the field of scan, based on the relationship of the positional data and the position of the selected points.

7. An image analysis system for extracting data from specific index points in a field of view including images during an initial scan of the field of view to qualify selected index points to key index point data during a subsequent scan of the field of view for measurement of the images within the field of view, comprising:

scanning means for scanning a field of view to produce a video signal;

video storage means for storing data corresponding to the video signal at coordinate index points in the field of view;

coordinate sequence and spacing logic means for qualifying index points as a function of numerical or geometrical relationships of index points relative to other index points; and measurement logic means for keying data from the video signal storage means as a function of the index points qualified by the qualifying means.

8. The image analysis system as defined in claim 7, wherein the coordinate sequence and spacing logic means includes a bistable device for qualifying alternative index points.

9. The image analysis system as defined in claim 8, wherein the coordinate sequence and spacing logic means includes a light pen for producing a light pen pattern which in cooperation with the scanning means qualifies an index point proximate the light pen pattern on an image display.

10. An image analysis system for extracting data from an initial field of scan and displaying the extracted data during a subsequent measurement field of scan of a field of view, comprising:

scanning means for scanning a field of view to produce a video signal;

index point generation means for generating specific index points as a function of the video signal;

coordinate storage means for storing coordinate data of the specific index points identified;

coordinate counter means to produce coordinate information in synchronism with a measurement scan of the field of view;

controller means for resetting the coordinate counter means at the beginning of a period of scan; and comparison means for comparing the stored coordinate data of the specific index points with the coordinate data of the coordinate counter to provide a detailed output index signal as a function of the comparison of the respective coordinate data.

* * * * *

UNITED STATES PATENT AND TRADEMARK OFFICE
CERTIFICATE OF CORRECTION

PATENT NO. : 4,115,806
DATED : September 19, 1978
INVENTOR(S) : Roger R.A. Morton It is certified that error appears in the above-identified patent and that said Letters Patent are hereby corrected as shown below:

Col. 5, line 5, after "significance" delete "of" and substitute therefore --or--;

Col. 13, line 49, delete "section" and substitute therefore --selection--;

Col. 14, line 8, delete "104" and substitute therefore --204--; and

Col. 16, line 40, delete "logic" (second occurrence).

Signed and Sealed this

Nineteenth Day of December 1978

[SEAL]

Attest:

RUTH C. MASON
Attesting Officer

DONALD W. BANNER
Commissioner of Patents and Trademarks